Nov. 21, 1939.  J. H. McMAHON ET AL  2,180,638
AMUSEMENT APPARATUS
Filed Oct. 27, 1937  4 Sheets-Sheet 2

INVENTORS
JOHN H. McMAHON
ARTHUR W. MILLER
BY
Harry C. Schroeder
ATTORNEY

Nov. 21, 1939.  J. H. McMAHON ET AL  2,180,638
AMUSEMENT APPARATUS
Filed Oct. 27, 1937  4 Sheets-Sheet 3

INVENTORS
JOHN H. McMAHON
ARTHUR W. MILLER
BY
Harry C. Schroeder
ATTORNEY

Nov. 21, 1939.　　　J. H. McMAHON ET AL　　　2,180,638
AMUSEMENT APPARATUS
Filed Oct. 27, 1937　　　4 Sheets-Sheet 4
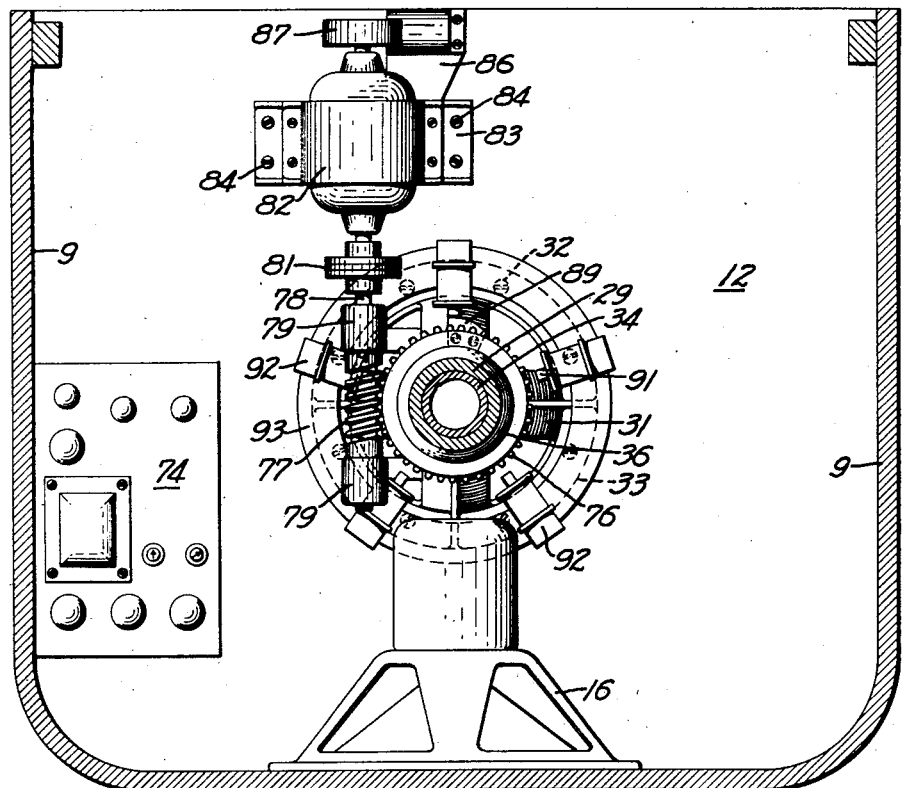
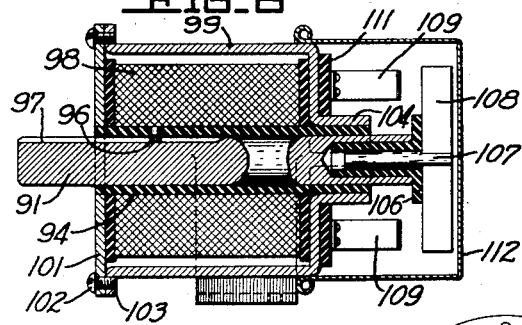
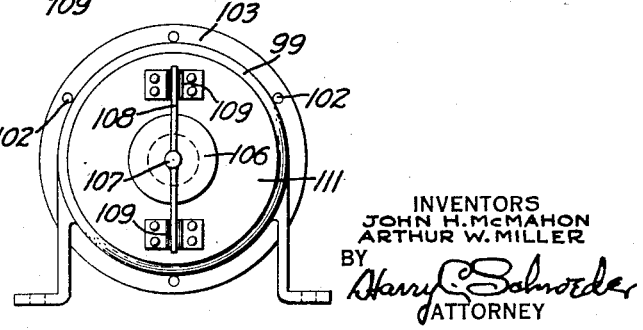
INVENTORS
JOHN H. McMAHON
ARTHUR W. MILLER
BY
Harry C. Schroeder
ATTORNEY Patented Nov. 21, 1939

2,180,638

UNITED STATES PATENT OFFICE 2,180,638

AMUSEMENT APPARATUS

John H. McMahon and Arthur W. Miller, Berkeley, Calif.

Application October 27, 1937, Serial No. 171,236

11 Claims. (Cl. 88—24)

This invention relates to automatic coin-operated devices used for public amusement.

It is an object of the invention to provide apparatus which will simultaneously exhibit and reproduce a visual and a related audible program.

Another object of the invention is to provide apparatus of the character described which permits a selection of any one of a plurality of programs.

A further object of the invention is to provide simple and efficient mechanism for effecting the selection of the various programs.

Still another object of the invention is to provide apparatus of the class referred to which is simplified to a point where the skill of service men attending it need not be of a high or specialized order.

The invention possess other objects and features of advantage, some of which, together with the foregoing, will be specifically set forth in the detailed description of the invention hereunto annexed. It is to be understood that the invention is not to be limited to the particular species thereof shown and described, as various other embodiments thereof may be employed within the scope of the appended claims.

Referring to the drawings:

Figure 5 is a horizontal sectional view of the apparatus. The plane of section is indicated by the line 5—5 of Figure 2.

Figure 6 is a vertical sectional view of one of the selector relays.

Figure 7 is an end elevational view of the structure shown in Figure 6 with the protecting cover for the switch removed.

Figure 1:
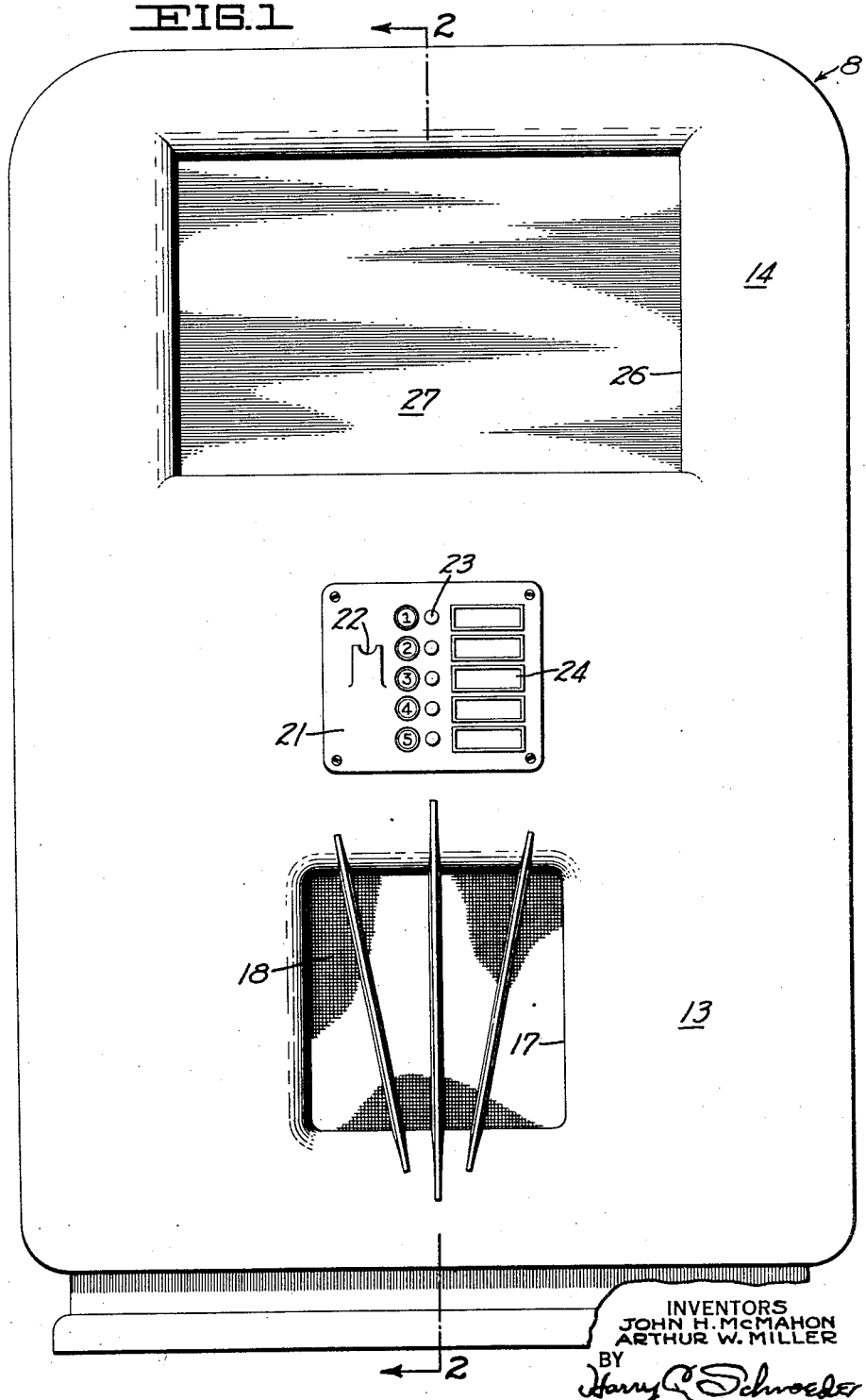
Figure 1 is a front elevational view of the apparatus of our invention.

Describing the invention in detail, the apparatus comprises a cabinet 8 having side walls 9, a top 11, a bottom floor 12, and a front panel consisting of a lower perpendicular portion 13 and a rearwardly inclined upper portion 14. On the inner surface of the panel portion 13 is mounted a dynamic sound reproducer 16 and an aperture 17 in the panel overlying the reproducer provides a vent for the sound waves emanating from the diaphragm. The usual sheet of fabric 18 is placed within the aperture 17 to prevent entry of dust particles into the magnetic gap of the speaker. In an aperture 19, in the panel portion 13, above the speaker aperture 17, is the usual coin-operated program selector 21 having a coin chute 22, a plurality of push buttons 23 by means of which various programs may be selected, and card holders 24 which contain the title and other information relative to the programs which will be seen and heard by depressing the push-buttons. In the upper inclined portion 14 of the panel is a relatively large rectangular opening 26 in which is mounted a motion picture screen, which may be made of the particular type of fabric generally used for exhibiting daylight movies but which is preferably a sheet of frosted glass 27 secured to the cabinet by a frame 28.

Mounted substantially centrally of the cabinet floor 12 is a pedestal having a centrally bored hub 29 supported on legs 31 which are secured, by screws 32 passing through a flange 33 forming an integral part of the legs, to the cabinet. Fixedly secured at one end in the bore of the hub 29, and extending upwardly axially of the latter, is a tubular post 34 upon which is journaled the hub 36 of a turntable. A thrust bearing 37 is provided between the lower end of the hub 36 and the upper end of the hub 29 to assist free rotation of the former hub on the post 34. Spaced equidistantly around the periphery of a flange 38, formed at the upper end of the hub 36, and secured thereto by means of bolts 39, are a plurality of brackets 41 each having a downwardly and outwardly sloping upper surface 42 upon which is mounted a motion picture projector unit 43. As will be pointed out later, each projector unit is a duplicate of the others and includes the usual light source, projecting lens and film actuating mechanism, so that each unit may project a different film.

Figure 2:
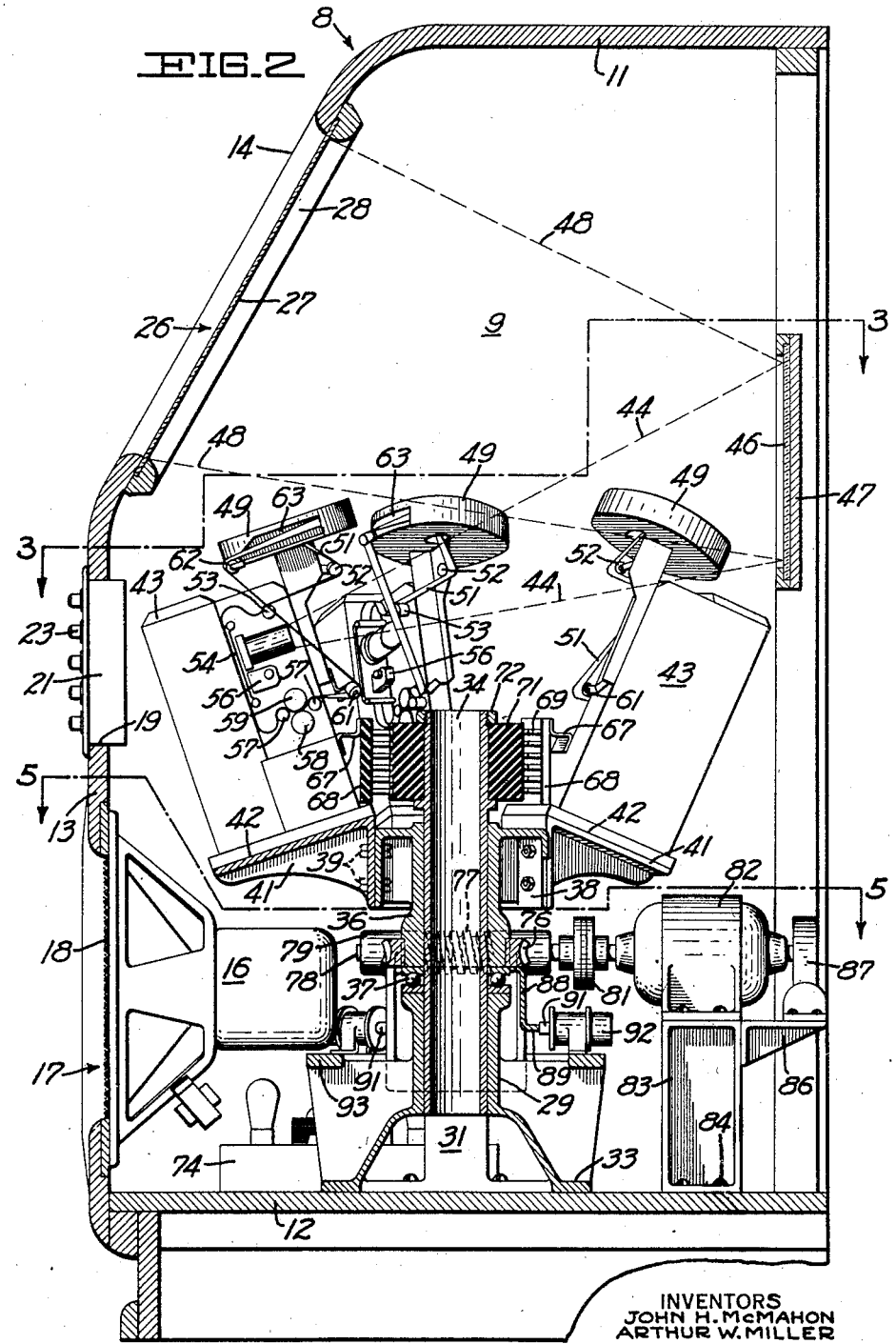
Figure 2 is a vertical sectional view of the apparatus. The plane of section in which the view is taken is indicated by the line 2—2 of Figure 1.
Figure 3:
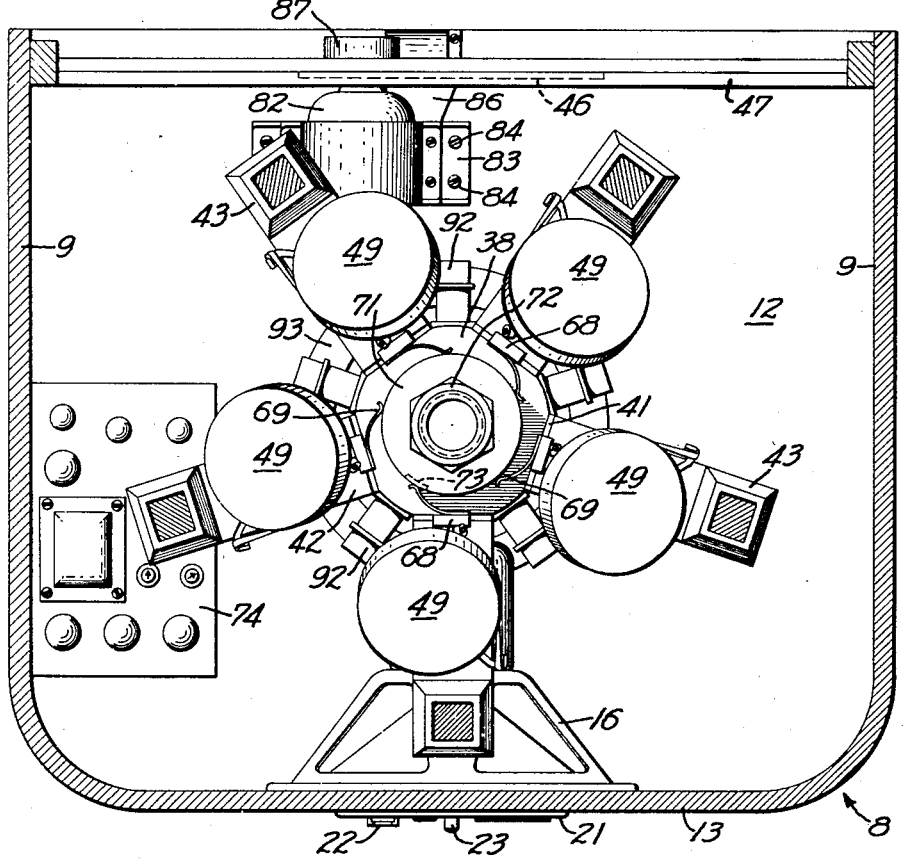
Figure 3 is a horizontal sectional view of the apparatus. The plane of section is indicated by the line 3—3 of Figure 2.

The slope of the surfaces 42 is such that, as each projector unit is moved into the position of the projector unit shown to the left of Figure 2, the light beam 44 therefrom will be directed on to the surface of a mirror 46, supported by a frame 47 secured at its ends to the side walls 9 of the cabinet and extending across the back of the latter, which will reflect the beam on to the rear surface of the screen 27 as indicated by the dotted lines 48. This construction, by folding the light beam, permits sufficient "throw" of the beam to produce a picture of about 16 by 22 inches on the screen 27 with a depth of the cabinet of approximately 2½ feet. Each projector is equipped for continuous running of a film, having mounted thereon a so-called "repeater" mechanism 49 from which the endless film 51 feeds over a guide roller 52, over a feed sprocket 53, through the film gate 54 and past the intermittent claw mechanism 56, over a pair of lower feed sprockets 57 which advance the film past a photoelectric cell 58 and the exciter lamp 59 therefor which translate the sound track on the film into a train of electrical impulses, over guide rollers 61 and 62 and back into the repeater through an opening 63 in the cover thereof. The usual projection lamp 64 and driving motor 66, indicated in the wiring diagram of Figure 4 but not shown in the other figures, are provided in each of the projectors 43. Mounted on each projector, by means of a bracket 67, is a block 68 of insulating material having fixed thereto, as is best shown in Figure 3, a plurality of spring metal contact arms 69 which extend toward the axis of the post 34 and rest against the periphery of a drum 71 of insulating material which is fixedly attached to the upper end of the post 34 by means of a nut 72. Embedded in the periphery of the drum 71 are a plurality of metallic contact segments 73, one for each of the contact arms contained on each block 68. Four of these contact segments are connected by wires, not shown, running downwardly through the hollow post 34, with an amplifier 74 which provides audio-frequency energy to actuate the speaker 16, and the remaining two contact segments carry current to energize the lamp 64 and motor 66 of the projector.

Means is provided for rotating the turntable to position a selected one of the projectors 43 to cast its light beam onto the reflecting mirror 46. Secured to the lower end of the turntable hub 36 is a worm gear 76 meshing with a worm 77, best shown in Figure 5, which is fixed for rotation with a shaft 78 journaled in a bracket 79 mounted on a portion, preferably the legs 31, of the fixed pedestal. The shaft 78 is connected, through a flexible coupling 81, with the shaft of a motor 82 which is mounted on a bracket 83 secured by screws 84 to the cabinet floor 12. A bracket 86, secured to and extending from the motor bracket 83, supports a solenoid brake 87 which is secured to the motor shaft and whose function will be described presently. An arm 88, having at its distal end a cam 89, is secured to and rotatable with the worm gear 76 so that the cam will move past the ends of armatures 91 of solenoid switches 92 mounted in spaced relation around the pedestal on a flange 93 formed integrally with the pedestal. One of the solenoid switches is shown in detail in Figures 6 and 7 and comprises an insulating sleeve 94 in which the armature 91 is axially slidable, a pin 96 secured in the sleeve being provided and working in a keyway 97 in the armature to prevent rotation of the latter with respect to the sleeve. Wound on a portion of the sleeve 94 is an actuating coil 98 and around the coil is an iron shell 99 forming part of a ferro-magnetic circuit which also consists of an iron plate 101 secured by screws 102 to a flange 103 at one end of the shell 99 and a divided sleeve 104 which is formed as an integral part of the shell at the opposite end of the latter and is positioned closely adjacent the armature 91 being insulated therefrom by the insulating sleeve 94. One end of the armature is bored out to frictionally receive and retain an insulating bushing 106 which is centrally bored and into which is pressed the shank 107 of a switch blade 108. This switch blade, when the armature is moved axially, is adapted to enter between and engage spaced contacts 109 which are mounted on an insulating disk 111 secured to the shell 99. A cover 112 is adapted to frictionally telescope over the end of the shell 99 so as to protect the switch against dirt and damage. It will be seen that, when the coil 98 is energized, the armature 91 will move to the left, being impelled by the flux in the magnetic circuit, which will project the end of the armature into the path of movement of the cam 89 and simultaneously close the switch comprising the contacts 109 and the blade 108. As the worm gear 76 rotates, the cam will contact the end of the armature causing the latter to move to the right to its normal position and opening the switch. What occurs when the switch is opened and closed will be described presently.

Figure 4:
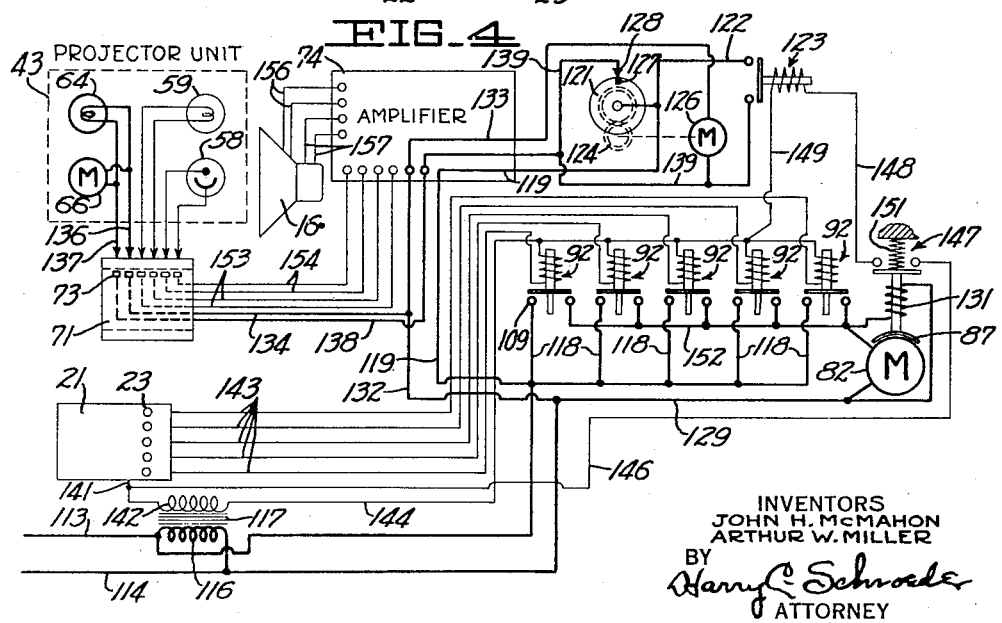
Figure 4 is a schematic wiring diagram showing the connection between the various electrical components of the apparatus.

Referring to the wiring diagram of Figure 4, a pair of power leads 113 and 114 are provided, which are connected to a suitable source of alternating current, the former lead being connected to one end of the primary winding 116 of a step-down transformer 117, continuing through branched leads 118 to one contact 109 of each of the solenoid switches 92, through a lead 119 to a brush contact bearing against a metallic disk 121 and through a lead 122 to one contact of a relay 123. The disk 121 is a timing device which limits the operating time of each projector 43 being driven, through a suitable gear system 124, by a synchronous induction motor 126. A small segment 127 of insulating material is provided in the periphery of the disk upon which normally rests a brush contact 128. The ratio of the gearing 124 is dependent on how much film is contained in the repeater magazines 49. Since the feeding speed of 16 m./m. sound film is approximately 35 feet per minute the disk would complete one revolution in a minute if the magazine contained 35 feet of film, one revolution in two minutes if the magazine contained 70 feet of film, and so forth. It is, of course, necessary that each magazine contain the same length of film in order that the timer will operate properly with each projector.

The power lead 114 is connected to the opposite end of the primary winding of the transformer 117, through a branch lead 129 to one terminal of the motor 82, and to one end of the actuating coil 131 of the solenoid brake 87. A branch lead 132, also a continuation of the power lead 114, connects with one of the power input terminals of the amplifier 74 and an extension lead 133 connects the latter terminal with one input terminal of the motor 126. Another extension lead 134 connects the lead 132 with one of the contact segments 73 which connects with a contact arm 69 and a lead 136 connected to one contact of both the projection lamp 64 and the projector driving motor 66. The other terminals of the lamp and motor are connected to a lead 137 which is attached to another of the contact arms 69 and is engageable by another of the contact segments 73, and a lead 138 connects the latter contact segment with the other power input terminal of the amplifier. A continuation lead 139 of the lead 138 connects with the brush contact 128 of the timer and with a terminal of each of the motor 126 and the relay 123.

The coin-operated selector switch 21 is provided with a low voltage input lead 141, which connects with one end of the secondary winding 142 of the transformer 117, and with five leads 143 which connect, respectively, with one end of each of the coils 98 of the selector relays 92. The other end of each coil is connected to a common lead 144 which runs to the other end of the secondary winding of the transformer 117. The pushbuttons 23 of the selector switch operate contacts which establish connection between the lead 141 and a selected one of the leads 143, depending upon which pushbutton is depressed, and a time delay device which is well known in the art and in the nature of a dashpot maintains this connection during an interval of time sufficient to allow components of the apparatus to complete their cycles of operation before the circuit is interrupted. A lead 146 connects the lead 141 with one terminal of a relay 147 associated with and operable by the solenoid brake 131, a lead 148 connects the other terminal of this relay with the actuating coil of the relay 123, and a lead 149 connects the other end of the coil of the relay 123 with the lead 144. The relay 147 closes only when the brake 87 of the motor 82 is released, the brake being normally set by the coil spring 151 when the motor is inactive.

In operation, assuming that the program represented by the uppermost pushbutton No. 1 is selected, a coin is inserted in the slot 22 which unlocks the pushbuttons and allows the one selected to be depressed. This establishes contact within the selector switch which permits current to flow from the lead 141 through the upper lead 143, through the coil of the selector relay furthest to the right, and back to the transformer secondary winding 142 via the lead 144. This, as was described above, causes the armature 91 of the relay to be projected into the path of movement of the cam 89 and bridges the contacts 109. As soon as the latter contacts close, circuit is established through the lead 113, the continuation lead 118, and the common lead 152, which connects with a contact of each relay 92, to the motor 82 and to the solenoid brake coil 131 connected in parallel with the latter. The circuit continues through the lead 129 back to the other power lead 114. As soon as the motor is energized, the solenoid brake will be released and the relay 147 will close. The motor 82 will now continue to rotate until the cam 89 engages the protruding armature 91 whereupon the armature will be depressed and the contacts 109 simultaneously opened thereby breaking the motor circuit, de-energizing the coil of the solenoid brake and allowing the brake, under the influence of the spring 151 to stop the motor practically instantaneously. This will have brought the projector unit 43 containing the film desired to be seen into correct position before the reflecting mirror 46.

While this indexing of the projector unit was taking place, the closed contacts of the relay 147 permitted current to flow, from the secondary winding of the transformer, through the lead 146, the aforementioned relay contacts, the lead 148, the coil of the relay 123, the lead 149, and the lead 144 back to the transformer. This caused the relay 123 to close which allowed current to flow from the power lead 113 through the leads 119 and 122, through the closed contacts of the relay 123, through the lead 139 to the motor 126, to the contact brush 128 and to the lead 138 connected to one of the contact segments 73. The other high voltage contact segment 73, the amplifier input terminal, and the other terminal of the motor 126 are permanently connected to the other power lead 114 as before described. The established circuits have caused the motor 126 to run, the amplifier 74 to be energized, which allows a short time interval before the selected projector unit is indexed into position for the cathodes of the amplifier tubes to be heated to emission temperature, and the high voltage contact segments 73 to be energized so that as soon as the projector is brought into position and the contact arms 69 thereof engage the contact segments 73 the lamp 64 will be lighted and the motor 66 will be started. The indexing of the projector into position will also establish contact between the exciter lamp 59 and the leads 153 which may carry filtered direct current or high frequency alternating current, the latter being supplied by an oscillator within the amplifier, and will establish connection between the photoelectric cell 58 and the signal input terminals of the amplifier through the leads 154. The amplified signals taken from the sound track of the film will be fed to the speaker 16 through the amplifier output leads 156. Leads 157, also from the amplifier, provide current for the field coil of the speaker.

When the selected projector unit has been indexed into position and the motor 82 stops, the relay 147 will open as will the relay 123. The opening of the latter relay will not, however, break the circuits to the projector and amplifier which it previously established for the reason that the motor 126, which was also energized when the relay 123 closed, in operating for a short interval of time rotated the disk 121 so that the brush contact 128 moved off of the insulating segment 127 thereby bridging the relay contacts and maintaining the flow of current to the amplifier, the projector and the motor 126 after the contacts of the relay 123 opened. This maintenance of the circuits will continue during the time necessary for the disk 121 to complete one revolution to bring the insulating segment 127 under the contact brush 128 whereupon the supply of current from the lead 119, which is part of the power lead 113, will be interrupted causing the de-energization of the projector, amplifier and timing motor 126. This completes one cycle of operation of the apparatus and conditions it for the selection of another program which latter may be accomplished by depositing a coin in the slot 22 and depressing one of the other pushbuttons 23, whereupon the entire cycle of operation described above will be repeated.

The amusement apparatus of our invention just described is quite compact, as will be noted, thereby requiring but little floor space for its installation and rendering it desirable in small places of amusement where there is very little available space. The apparatus is comparatively trouble-free being constructed sufficiently rugged to withstand greater-than ordinary rough usage. In addition to these desirable features, there are no complicated cam motions, as in other like devices, which are likely to slip and require the services of highly skilled and paid mechanics to correct.

We claim:

1. An amusement apparatus comprising a cabinet, a picture screen in said cabinet, a pedestal mounted in said cabinet, said pedestal having a post rising therefrom and an annular flange surrounding said post, a turntable journaled on said post, a plurality of picture projectors carried by said turntable, a worm gear on said turntable, a worm journaled on said pedestal and meshing with said worm gear, a motor in said cabinet operatively connected to rotate said worm, worm gear and turntable to move successive picture projectors past a position below said picture screen, a plurality of electric switches mounted on said pedestal flange and connected to control the operation of said motor, means carried by said turntable to engage and actuate a selected one of said switches to fix a selected one of said picture projectors in said position below the picture screen to project light rays away from said screen, and means in said cabinet and disposed in the path of said projected light rays for intercepting said light rays and directing them toward said screen.

2. An amusement apparatus comprising a cabinet, a picture screen in said cabinet, a pedestal mounted in said cabinet, said pedestal having a post rising therefrom and an annular flange surrounding said post, a turntable journaled on said post, a plurality of picture projectors carried by said turntable, a worm gear on said turntable, said worm gear having fixed thereto and extending therefrom an arm provided with a cam surface movable when said worm gear is rotated in an arcuate path about the axis of said post, a worm journaled on said pedestal and meshing with said worm gear, a motor in said cabinet operatively connected to rotate said worm, worm gear and turntable to move successive picture projectors past a position below said picture screen, a plurality of electric switches mounted on said pedestal flange and connected to start and stop said motor, each of said switches comprising an operating element extendible into the path of movement of said cam surface when the switch is closed and retractible by engagement of the cam surface therewith, during movement of the latter, to open said switch, said closing and opening of a selected switch respectively starting the rotation of the turntable and stopping said rotation at a predetermined point to fix a selected picture projector in said position below the picture screen to project light rays in a direction away from said screen, and an element having a light reflecting surface thereon mounted in said cabinet in the path of said projected light rays for directing said light rays toward said picture screen.

3. An amusement apparatus comprising a cabinet provided with a picture screen, a rotatable support, a plurality of independently operable picture projecting units carried by said support in such manner as to be movable past said screen, a motor for imparting movement to said support, selective control means for said motor, said control means including independently operable selective motor disabling means operable by movement of said support for arresting movement of the motor in such manner as to place a pre-selected projecting unit in operative projecting relation with respect to said screen.

4. An amusement apparatus comprising a cabinet provided with a picture screen, a rotatable support, a plurality of independently operable picture projecting units carried by said support in such manner as to be movable past said screen, a motor for imparting movement to said support, a plurality of independently operable selector devices controlling said motor, there being one selective device for each projecting unit, and means for selectively operating any pre-selected selector device to start the motor, each of said selector devices including independently operable motor disabling means operable by rotative movement of the support for temporarily disabling the pre-selected selector device in a manner to place a pre-selected projecting unit in operative projecting relation with respect to said screen.

5. An amusement apparatus comprising a cabinet, a light reflecting medium within the cabinet, a picture screen supported by the cabinet and so positioned as to intercept light reflected from the reflecting medium, a rotatable support, a plurality of independently operable picture projecting units carried by said support in such manner as to be movable past said light reflecting medium, a motor for imparting movement to said support, selective control means for said motor, said control means including independently operable selective motor disabling means operated by movement of the support for arresting movement of the motor in such manner as to place a pre-selected projecting unit in operative projecting relation with respect to said light reflecting medium.

6. An amusement apparatus comprising a cabinet provided with a picture screen, a rotatable support, a plurality of independently operable picture projecting units carried by said support in such manner as to be movable past the screen, a motor for imparting movement to said support, a plurality of switches each having means for controlling the motor circuit and each including an independent motor-disabling means, there being one switch for each picture projecting unit, selective means for energizing any pre-selected switch and simultaneously setting said motor disabling means, means carried by said rotatable support for engaging and operating the selected disabling means in such manner as to stop the motor with a pre-selected projecting unit in operative projecting relation with respect to said screen.

7. An amusement apparatus comprising a cabinet provided with a picture screen, a rotatable support, a plurality of independently operable picture projecting units carried by said support in such manner as to be movable past the screen, a motor for imparting movement to said support, a plurality of solenoid switches each having an independently operable motor-disabling projection, there being one switch for each of said picture projecting units, each switch having means for controlling the motor circuit, an operating cam carried by said support, selective means for energizing any pre-selected solenoid switch in such manner as to cause the disabling projection thereof to extend into the path of said cam, so as to operate said disabling projection to deenergize the motor when the picture projecting unit associated with the pre-selected solenoid switch is in operative projecting relation with respect to said screen.

8. An amusement apparatus comprising a cabinet having a picture screen, a pedestal within said cabinet having a fixed post rising therefrom, a turn table journaled on said post, a plurality of independently operable picture projecting units carried by said turn table in such manner as to be movable past said screen, a motor for imparting movement to said support, means for selectively operating said motor, said means including a plurality of selector devices supported by said pedestal, there being one selector device for each projecting unit, each selector device having an independent selectively operable motor-disabling member, and means movable with said turn table for actuating the motor disabling member of any pre-selected selector device in such manner as to deenergizes the motor and place a pre-selected projecting unit in operative projecting relation with respect to said screen.

9. An amusement apparatus comprising a cabinet provided with a picture screen, a rotatable support, a plurality of independently operable picture projecting units carried by said support in such manner as to movable past said screen, a motor for imparting movement to said support, selective control means for said motor, said control means including independently operable selective motor disabling means operable by movement of said support for arresting movement of the motor in such manner as to place a pre-selected projecting unit in operative projecting relation with respect to said screen, and means controlled by said support and operable by movement thereof for operating the pre-selected projecting unit for a limited time after its position with respect to said screen.

10. An amusement apparatus comprising a cabinet provided with a picture screen, a rotatable support, a plurality of independently operable picture projecting units carried by said support in such manner as to be movable past said screen, a motor for imparting movement to said support, selective control means for said motor, said control means including independently operable selective motor disabling means operable by movement of said support for arresting movement of the motor in such manner as to place a pre-selected projecting unit in operative projecting relation with respect to said screen, a selector switch including a plurality of fixed members each controlling the operation of a picture projecting unit and a complemental movable switch member secured to and rotative with said support, said selector switch having means for selectively operating a pre-selected projecting unit for a limited time while said unit remains in its pre-selected position.

11. An amusement apparatus comprising a cabinet provided with a picture screen, a fixed support within the cabinet, a turn table rotatably mounted upon said support, a plurality of independently operable picture projecting units carried by said turn table in such manner as to be movable past said screen, each unit including an operating motor, a motor for imparting movement to said turn table, a plurality of turn table-motor controlling switches mounted on said support, there being one switch for each projecting unit, a cam rotatable with said turn table, selective means for closing the circuit to the respective motor controlling switches through any pre-selected switch, each of the last mentioned switches including means for projecting a motor-disabling extension into the path of said cam when said circuit is closed, said extension having means to break the circuit to the motor when engaged by said cam, so that a pre-selected projecting unit is positioned in operative relation to said screen, a second selective switch for controlling the circuits to the projecting unit motors, said last mentioned switch including a movable member which is rotatable with said turn table and individual fixed contact members, one for each projecting unit motor, said fixed contacts being so relatively positioned that as a pre-selected turn table motor switch is disabled, a circuit is simultaneously closed to the motor of the pre-selected projecting unit, and means for breaking the last mentioned circuit after a limited time.

JOHN H. McMAHON.
ARTHUR W. MILLER.